United States Patent
Kotani

(10) Patent No.: US 11,502,577 B2
(45) Date of Patent: Nov. 15, 2022

(54) ROTARY WING DRIVING APPARATUS

(71) Applicant: SUBARU CORPORATION, Tokyo (JP)

(72) Inventor: Kazuaki Kotani, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 415 days.

(21) Appl. No.: 16/731,929

(22) Filed: Dec. 31, 2019

(65) Prior Publication Data

US 2020/0220428 A1 Jul. 9, 2020

(30) Foreign Application Priority Data

Jan. 9, 2019 (JP) .............................. JP2019-002133

(51) Int. Cl.
| | |
|---|---|
| *H02K 7/102* | (2006.01) |
| *H02P 15/00* | (2006.01) |
| *H02P 3/04* | (2006.01) |
| *B60L 50/60* | (2019.01) |
| *B64D 27/24* | (2006.01) |

(52) U.S. Cl.
CPC ............ *H02K 7/1023* (2013.01); *B60L 50/60* (2019.02); *B64D 27/24* (2013.01); *H02P 3/04* (2013.01); *H02P 15/00* (2013.01)

(58) Field of Classification Search
CPC ....... H02K 7/1023; B60L 50/60; B64D 27/24; F04D 25/0673; F04D 29/043; Y02T 10/70; B64C 2201/027; B64C 2201/042; B64C 2201/108; B64C 39/024; B64C 27/14
See application file for complete search history.

(56) References Cited

U.S. PATENT DOCUMENTS

| | | | | |
|---|---|---|---|---|
| 2,408,683 A | | 10/1946 | Price | |
| 4,676,331 A | * | 6/1987 | Iwaki | B62D 6/10 180/443 |
| 4,685,528 A | * | 8/1987 | Suzuki | B62D 5/0463 701/41 |
| 5,047,700 A | * | 9/1991 | Szakaly | G05B 19/427 318/568.1 |
| 7,612,477 B2 | * | 11/2009 | Abe | F16D 55/02 310/90 |
| 8,013,485 B2 | * | 9/2011 | Miyashita | H02K 11/215 310/77 |

(Continued)

FOREIGN PATENT DOCUMENTS

| | | |
|---|---|---|
| CN | 106516128 B | 8/2018 |
| FR | 1006502 A | 4/1952 |

(Continued)

OTHER PUBLICATIONS

Extended European Search Report issued in corresponding European Patent Application No. 19213731.3-1010, dated May 20, 2020.

(Continued)

*Primary Examiner* — Pedro J Cuevas
(74) *Attorney, Agent, or Firm* — McDermott Will & Emery LLP

(57) ABSTRACT

A rotary wing driving apparatus includes a motor, a rotary wing, and an electromagnetic brake. The rotary wing is attached to a shaft of the motor. The electromagnetic brake is attached to the shaft of the motor.

4 Claims, 3 Drawing Sheets

(56) References Cited

U.S. PATENT DOCUMENTS

| | | | | |
|---|---|---|---|---|
| 8,434,439 B2* | 5/2013 | Richter | ............... | F01L 1/352 |
| | | | | 123/90.17 |
| 9,145,163 B2* | 9/2015 | Castaneda | ............... | B62B 5/063 |
| 9,494,218 B2* | 11/2016 | Honda | ............... | F16H 3/727 |
| 9,663,236 B1* | 5/2017 | Shiosaki | ............... | B64D 31/06 |
| 10,203,029 B2* | 2/2019 | Isono | ............... | F16H 48/36 |
| 10,479,190 B2* | 11/2019 | Li | ............... | B60K 17/046 |
| 10,988,247 B2* | 4/2021 | Iskrev | ............... | B64C 27/14 |
| 11,025,133 B2* | 6/2021 | Goossens | ............... | H02K 7/125 |
| 2001/0023383 A1* | 9/2001 | Ishihara | ............ | H02M 7/53873 |
| | | | | 180/443 |
| 2001/0030075 A1* | 10/2001 | Furumi | ............... | B62D 5/0445 |
| | | | | 180/445 |
| 2003/0047374 A1* | 3/2003 | Peppler | ............... | B62D 5/0421 |
| | | | | 180/443 |
| 2008/0191567 A1* | 8/2008 | Abe | ............... | F16D 55/02 |
| | | | | 310/77 |
| 2009/0284105 A1* | 11/2009 | Miyashita | ............ | H02K 11/0141 |
| | | | | 310/68 B |
| 2012/0067315 A1* | 3/2012 | Richter | ............... | F01L 1/352 |
| | | | | 123/90.31 |
| 2012/0146438 A1* | 6/2012 | Ide | ............... | H02K 7/1023 |
| | | | | 188/72.3 |
| 2014/0262593 A1* | 9/2014 | Castaneda | ............ | B62D 6/10 |
| | | | | 180/446 |
| 2015/0192192 A1* | 7/2015 | Honda | ............ | B60L 15/2054 |
| | | | | 475/10 |
| 2016/0363924 A1* | 12/2016 | Tanaka | ............... | G05B 19/4063 |
| 2017/0008403 A1* | 1/2017 | Yazdanpanah | ............ | B60L 7/26 |
| 2017/0166061 A1* | 6/2017 | Isono | ............... | H02K 7/1025 |
| 2017/0241533 A1* | 8/2017 | Isono | ............... | F16H 48/10 |
| 2018/0201119 A1* | 7/2018 | Li | ............... | H02K 7/116 |
| 2019/0049971 A1* | 2/2019 | Tanaka | ............... | B25J 15/0616 |
| 2019/0118941 A1* | 4/2019 | Iskrev | ............... | B64C 11/32 |
| 2020/0266682 A1* | 8/2020 | Goossens | ............... | H02K 7/125 |
| 2020/0358335 A1* | 11/2020 | Essert | ............... | H02K 11/28 |
| 2021/0126507 A1* | 4/2021 | Ito | ............... | H02K 5/225 |
| 2021/0245794 A1* | 8/2021 | Kogure | ............... | B62D 5/001 |
| 2022/0069668 A1* | 3/2022 | Huard | ............... | H02K 7/1023 |
| 2022/0081112 A1* | 3/2022 | Inuma | ............... | B66D 1/525 |

FOREIGN PATENT DOCUMENTS

| | | | | |
|---|---|---|---|---|
| JP | 04-173497 A | 6/1992 | | |
| WO | 2016/053408 A1 | 4/2016 | | |
| WO | 2018/193522 A | 10/2018 | | |
| WO | 2019/079688 A1 | 4/2019 | | |
| WO | WO-2019079688 A1 * | 4/2019 | ........... | B64C 11/306 |

OTHER PUBLICATIONS

Japanese Notice of Reasons for Refusal issued in corresponding Japanese Patent Application No. 2019-002133, dated Sep. 6, 2022, with English translation.

* cited by examiner

ROTARY WING DRIVING APPARATUS

CROSS-REFERENCE TO RELATED APPLICATIONS

The present application claims priority from Japanese Patent Application No. 2019-002133 filed on Jan. 9, 2019, the entire contents of which are hereby incorporated by reference.

BACKGROUND

The disclosure relates to rotary wing driving apparatuses.

Japanese Unexamined Patent Application Publication H4-173497 discloses a vertical takeoff and landing (VTOL) aircraft that obtains lift by rotating a propeller using either one of an engine and a motor.

SUMMARY

An aspect of the disclosure provides a rotary wing driving apparatus including a motor, a rotary wing, and an electromagnetic brake. The rotary wing is attached to a shaft of the motor. The electromagnetic brake is attached to the shaft of the motor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

With regard to a VTOL aircraft, attitude-angle control of the aircraft body tends to become unstable during hovering. Thus, it is desirable that the VTOL aircraft perform stable attitude-angle control. In order to perform stable attitude-angle control, it is desirable that the VTOL aircraft constantly have sufficient acceleration performance.

If the VTOL aircraft is configured to rotate a propeller by using a motor, it is desirable that the VTOL aircraft include a motor having a maximum torque that is double or more the rated torque (e.g., torque used for levitating the aircraft body) so as to perform the attitude-angle control stably. Therefore, in order to perform stable attitude-angle control, the motor in the VTOL aircraft is to be increased in size.

It is desirable to provide a rotary wing driving apparatus that can suppress an increase in size of the motor.

Figure 1:
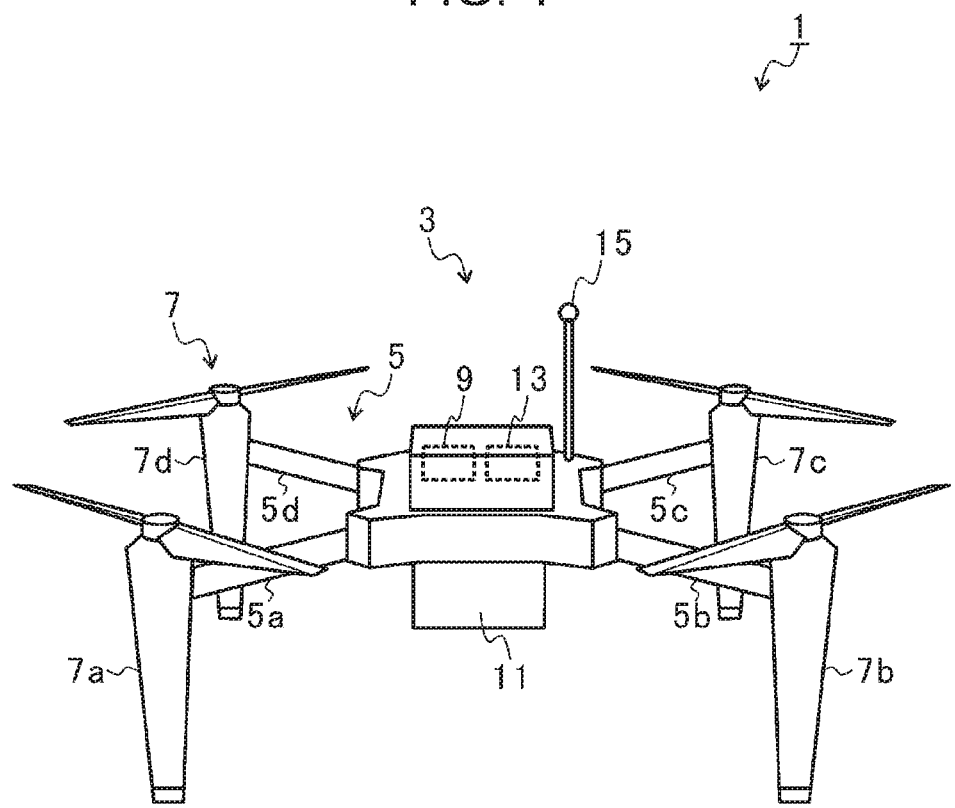
FIG. 1 is a perspective view schematically illustrating a VTOL aircraft according to an embodiment of the disclosure.

FIG. 1 is a perspective view schematically illustrating a vertical takeoff and landing (VTOL) aircraft 1 according to an embodiment of the disclosure. The VTOL aircraft 1 according to this embodiment is a multicopter that can obtain lift (thrust) by using rotating wings, and the scale of the aircraft includes anything from an unmanned aircraft called a drone to a large-scale manned aircraft. The VTOL aircraft 1 includes a main unit 3, an arm unit 5, and a rotary wing unit 7. The main unit 3 includes a power source (battery) 9, a compartment 11, a central controller 13, and a receiver 15.

The power source 9 supplies electric power to each of the units (e.g., the rotary wing unit 7 and the central controller 13) in the VTOL aircraft 1. In this embodiment, the compartment 11 is a human-boardable section. Alternatively, the compartment 11 may be a luggage-loadable section. The compartment 11 is provided with an operation unit (not illustrated). An occupant (i.e., a pilot) in the compartment maneuvers the VTOL aircraft 1 by operating the operation unit. The central controller 13 controls the rotary wing unit 7 based on an operation signal (i.e., a control signal) from the operation unit so as to control, for example, ascending, descending, hovering, and horizontal movement of the VTOL aircraft 1.

As an alternative to this embodiment where the occupant (i.e., the pilot) who has boarded the compartment 11 maneuvers the VTOL aircraft 1, the VTOL aircraft 1 may be maneuvered based on a control signal transmitted from a remote location or may fly autonomously in accordance with a program input in advance. For example, the receiver 15 receives a control signal transmitted from a transmitter (not illustrated) disposed at a remote location. For example, the transmitter is for wireless maneuvering and is provided with an operation unit. The pilot maneuvers the VTOL aircraft 1 by operating the operation unit in the transmitter from a remote location. The central controller 13 controls the rotary wing unit 7 based on a control signal received by the receiver 15 so as to control, for example, ascending, descending, hovering, and horizontal movement of the VTOL aircraft 1. As another alternative, the VTOL aircraft 1 may fly autonomously based on a program stored in advance in a storage unit (not illustrated) of the central controller 13.

The arm unit 5 includes a power supply line for supplying electric power to the rotary wing unit 7. The arm unit 5 includes a first arm 5a, a second arm 5b, a third arm 5c, and a fourth arm 5d. The rotary wing unit 7 includes a first rotary wing unit 7a, a second rotary wing unit 7b, a third rotary wing unit 7c, and a fourth rotary wing unit 7d.

The first arm 5a has a first end coupled to the main unit 3 and a second end coupled to the first rotary wing unit 7a. The first arm 5a links the main unit 3 and the first rotary wing unit 7a, and supports the first rotary wing unit 7a. The second arm 5b has a first end coupled to the main unit 3 and a second end coupled to the second rotary wing unit 7b. The second arm 5b links the main unit 3 and the second rotary wing unit 7b, and supports the second rotary wing unit 7b.

The third arm 5c has a first end coupled to the main unit 3 and a second end coupled to the third rotary wing unit 7c. The third arm 5c links the main unit 3 and the third rotary wing unit 7c, and supports the third rotary wing unit 7c. The fourth arm 5d has a first end coupled to the main unit 3 and a second end coupled to the fourth rotary wing unit 7d. The fourth arm 5d links the main unit 3 and the fourth rotary wing unit 7d, and supports the fourth rotary wing unit 7d.

The first arm 5a and the first rotary wing unit 7a have configurations identical to those of the second arm 5b and the second rotary wing unit 7b, the third arm 5c and the third rotary wing unit 7c, and the fourth arm 5d and the fourth rotary wing unit 7d. Therefore, the configurations of the first arm 5a and the first rotary wing unit 7a will be described below as an example, whereas the descriptions regarding the configurations of the second arm 5b and the second rotary wing unit 7b, the third arm 5c and the third rotary wing unit 7c, and the fourth arm 5d and the fourth rotary wing unit 7d will be omitted.

Figure 2:
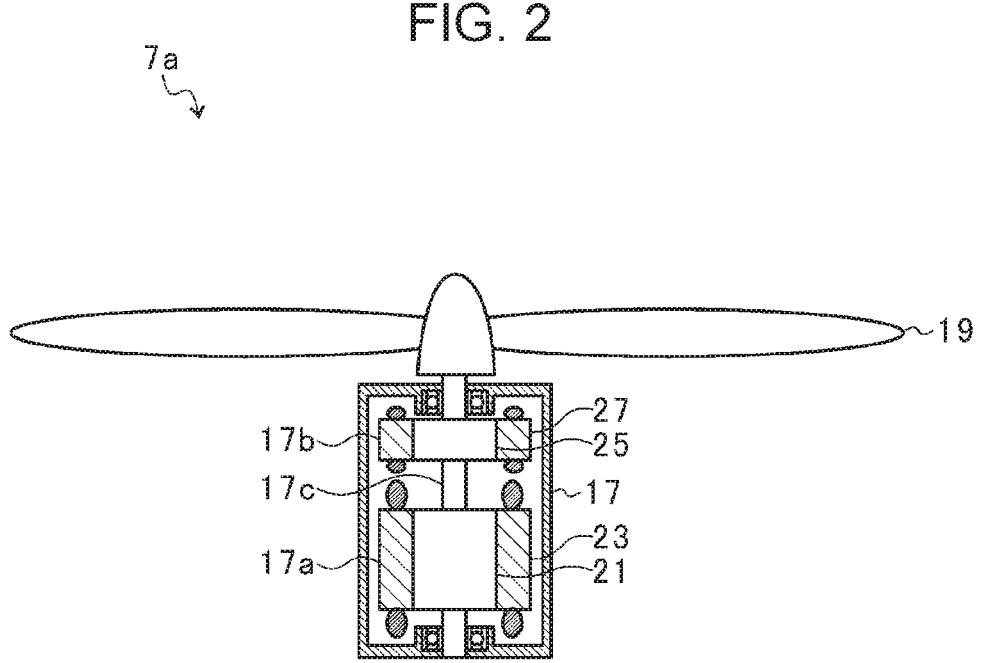
FIG. 2 illustrates the configuration of a first rotary wing unit.

FIG. 2 illustrates the configuration of the first rotary wing unit 7a. As illustrated in FIG. 2, the first rotary wing unit 7a includes a driving unit 17 and a propeller (i.e., a rotary wing) 19. The driving unit 17 rotates the propeller 19. The driving unit 17 includes a motor 17a and an electromagnetic brake 17b.

The motor 17a includes a rotor 21 and a stator 23. In the motor 17a, for example, the rotor 21 is provided with a permanent magnet, and the stator 23 is provided with a coil. When electric current is applied to the coil of the stator 23, the rotor 21 provided with the permanent magnet rotates.

The motor 17a also includes a shaft (i.e., a rotating shaft) 17c. The shaft 17c is attached to a rotational axis of the rotor 21. The shaft 17c rotates together with the rotor 21 about the rotational axis of the rotor 21. The shaft 17c may be integrated with the rotor 21 or may be separate from the rotor 21.

The electromagnetic brake 17b is attached to the shaft 17c of the motor 17a. The electromagnetic brake 17b is a braking device that applies braking torque (i.e., a braking force) to the shaft 17c. The electromagnetic brake 17b has a configuration similar to that of the motor 17a. In other words, the electromagnetic brake 17b includes a rotor 25 and a stator 27. In the electromagnetic brake 17b, for example, the rotor 25 is provided with a permanent magnet, and the stator 27 is provided with a coil.

The rotor 25 is attached to the shaft 17c and rotates together with the shaft 17c about a rotational axis of the shaft 17c. The rotor 25 may be integrated with the shaft 17c or may be separate from the shaft 17c. When the shaft 17c rotates, the rotor 25 provided with the permanent magnet rotates, thus causing electric current to flow to the coil of the stator 27. In this case, the stator 27 applies braking torque to the rotor 25 in a non-contact fashion.

Accordingly, the electromagnetic brake 17b functions as a non-contact braking device that applies braking torque to the shaft 17c (i.e., the rotor 25) when the shaft 17c rotates. Furthermore, in the electromagnetic brake 17b, electric current flows to the coil of the stator 27 when the shaft 17c rotates. Therefore, the electromagnetic brake 17b functions as a power generator when the shaft 17c rotates.

The propeller 19 is attached to the shaft 17c of the motor 17a and rotates together with the shaft 17c about the rotational axis of the shaft 17c. Accordingly, the shaft 17c of the motor 17a also functions as a shaft of the propeller 19. The propeller 19 rotates with the same rotational speed as the rotational speed of the motor 17a. The propeller 19 converts the rotational force of the motor 17a into thrust (lift).

Figure 3:
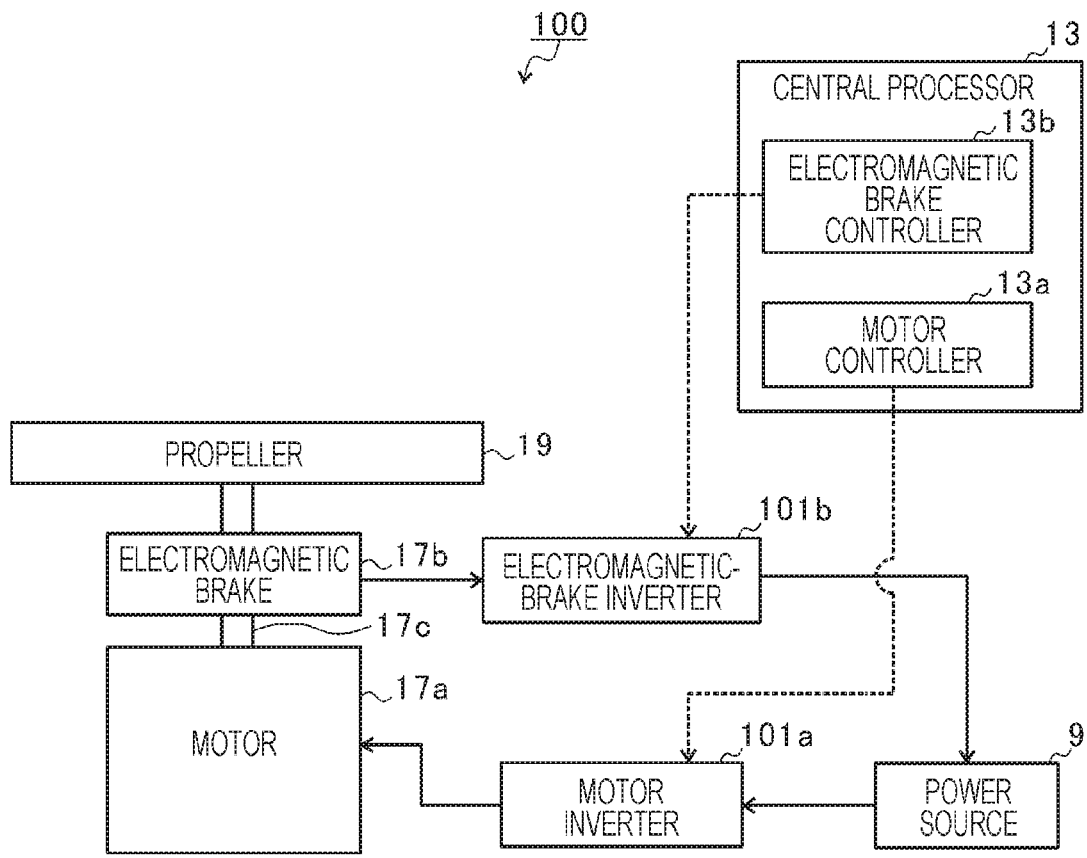
FIG. 3 is a block diagram schematically illustrating the configuration of a rotary wing driving apparatus according to the embodiment of the disclosure.

FIG. 3 is a block diagram schematically illustrating the configuration of a rotary wing driving apparatus 100 according to this embodiment. The rotary wing driving apparatus 100 is provided in the VTOL aircraft 1. In FIG. 3, a solid arrow denotes the flow of electric power, and a dashed arrow denotes the flow of a control signal. As illustrated in FIG. 3, the rotary wing driving apparatus 100 includes the power source 9, the central controller 13, the motor 17a, the electromagnetic brake 17b, the shaft 17c, the propeller 19, a motor inverter 101a, and an electromagnetic-brake inverter 101b.

The power source 9 is coupled to the motor 17a via the motor inverter 101a. The power source 9 supplies electric power to the motor 17a via the motor inverter 101a. The power source 9 is also coupled to the electromagnetic brake 17b via the electromagnetic-brake inverter 101b. The power source 9 is supplied with (i.e., collects) electric power generated by the electromagnetic brake 17b via the electromagnetic-brake inverter 101b.

The central controller 13 is constituted by a semiconductor integrated circuit including a central processing unit (CPU), a read-only memory (ROM) having a program stored therein, and a random access memory (RAM) as a work area, and controls the entire VTOL aircraft 1. The central controller 13 may serve also as a motor controller 13a and an electromagnetic brake controller 13b by operating in cooperation with a program.

The motor controller 13a controls (a switching element of) the motor inverter 101a to control the rotational speed and the torque of the motor 17a (i.e., the propeller 19). The motor controller 13a controls the motor inverter 101a to control the electric current applied to the coil provided in the stator 23 (see FIG. 2) and the frequency of the electric current, thereby controlling the rotational speed and the torque of the motor 17a. For example, the motor controller 13a controls the rotational speed and the torque of the motor 17a based on the control signal mentioned above. The motor controller 13a controls the rotational speed and the torque of the propeller 19 to generate thrust (lift) for the VTOL aircraft 1.

The electromagnetic brake controller 13b controls (a switching element of) the electromagnetic-brake inverter 101b to control the braking torque of the electromagnetic brake 17b. While applying the braking torque to the shaft 17c, the electromagnetic brake 17b converts the rotational force of the shaft 17c into electric power. The electromagnetic brake controller 13b controls the braking torque of the electromagnetic brake 17b to cause the electric power converted (generated) by the electromagnetic brake 17b to change. In other words, the electromagnetic brake controller 13b controls the electric power generated by the electromagnetic brake 17b. The electromagnetic brake controller 13b causes the power source 9 to store the electric power generated by the electromagnetic brake 17b.

With regard to the VTOL aircraft 1, attitude-angle control of the aircraft body tends to become unstable during hovering. Thus, it is desirable that the VTOL aircraft 1 perform stable attitude-angle control. In order to perform stable attitude-angle control, it is desirable that the VTOL aircraft 1 constantly have sufficient acceleration performance.

The VTOL aircraft 1 obtains lift by rotating the propeller 19 using the motor 17a. The lift includes a force for levitating the aircraft body and a force for stabilizing the attitude-angle control of the aircraft body relative to the external environment, such as wind. The torque of the motor 17a used for levitating the body of the VTOL aircraft 1 is called rated torque. The torque of the motor 17a used for stabilizing the attitude-angle control of the body of the VTOL aircraft 1 is called acceleration torque.

Figure 4:
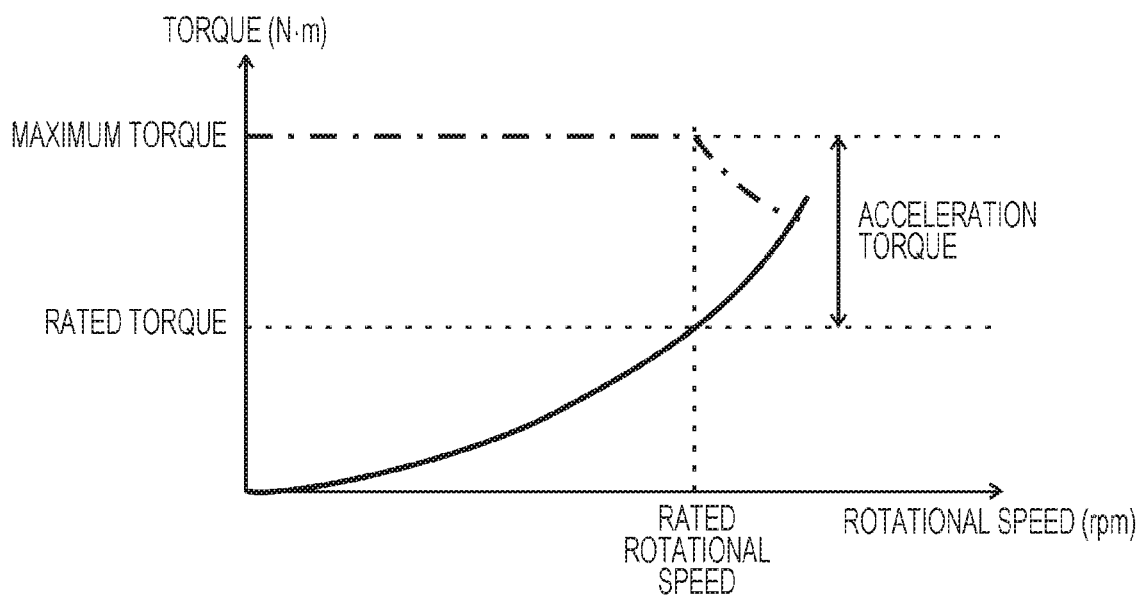
FIG. 4 illustrates the characteristics of a commonly-used motor.

FIG. 4 illustrates the characteristics of a commonly-used motor. In FIG. 4, the ordinate axis indicates the torque of the motor, and the abscissa axis indicates the rotational speed of the motor. In FIG. 4, the maximum torque of the motor is indicated by a single-dot chain line, and the torque used for actuating the propeller 19 (referred to as "propeller absorption torque" hereinafter) is indicated by a solid line.

For example, it is assumed that the motor has a rated torque of 3.5 N·m during a rated operation and a rated rotational speed of 8000 rpm. In order to perform (stable) attitude-angle control in view of the occupant's riding comfort, it is desirable that the motor normally have a 5% control bandwidth and 5-Hz aircraft-direction control characteristics. In that case, the VTOL aircraft 1 desirably has an acceleration torque of 5.4 N·m for performing stable attitude-angle control using the motor alone. In other words, the motor desirably has a maximum torque of at least 8.9 N·m.

Accordingly, the motor used in the related art has a maximum torque that is double or more the rated torque for performing stable attitude-angle control of the VTOL aircraft 1. Therefore, in the related art, the motor is increased in size for performing stable attitude-angle control of the VTOL aircraft 1.

In order to suppress such an increase in size of the motor, the rotary wing driving apparatus 100 according to this embodiment includes the electromagnetic brake 17b and the electromagnetic brake controller 13b. As mentioned above, in order to perform (stable) attitude-angle control, the motor 17a desirably has a 5% control bandwidth and 5-Hz aircraft-direction control characteristics. However, for example, if a 5% control bandwidth and 5-Hz aircraft-direction control characteristics are to be ensured by the motor 17a alone during a rated operation, the motor 17a used desirably has a maximum torque that is double or more the rated torque, as mentioned above. Thus, in this embodiment, the motor 17a and the electromagnetic brake 17b are combined, thereby ensuring a 5% control bandwidth relative to an output (i.e., a target output) of the motor 17a and 5-Hz aircraft-direction control characteristics.

Figure 5A:
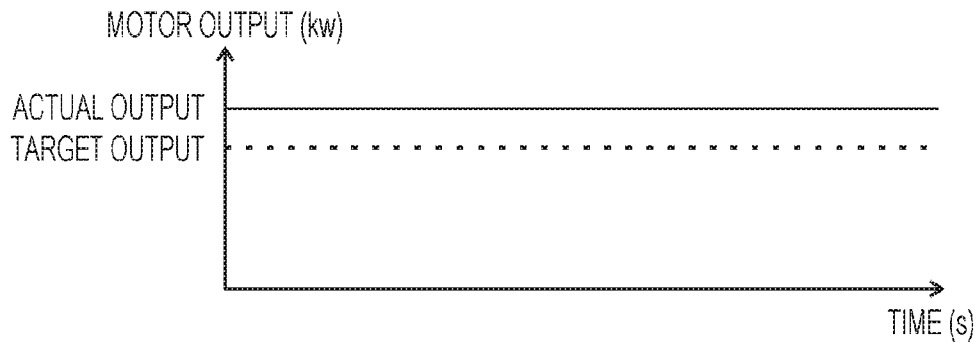
FIG. 5A to FIG. 5D illustrate the relationship among a motor output of a motor, a braking force of an electromagnetic brake, and a propeller output and a propeller rotational speed of a propeller, FIG. 5A illustrating a state where the motor is outputting a motor output (i.e., an actual output) that is larger than a target output, FIG. 5B illustrating a state where the electromagnetic brake is applying a braking force, FIG. 5C illustrating, as a propeller output, a combined output of the motor output of the motor and the braking force of the electromagnetic brake (i.e., motor output—braking force), FIG. 5D illustrating the propeller rotational speed when the propeller is rotating with the propeller output illustrated in FIG. 5C.
Figure 5B:
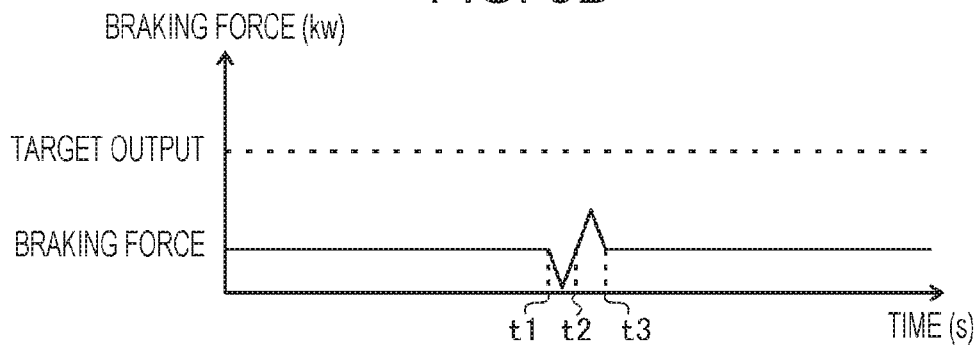
Figure 5C:
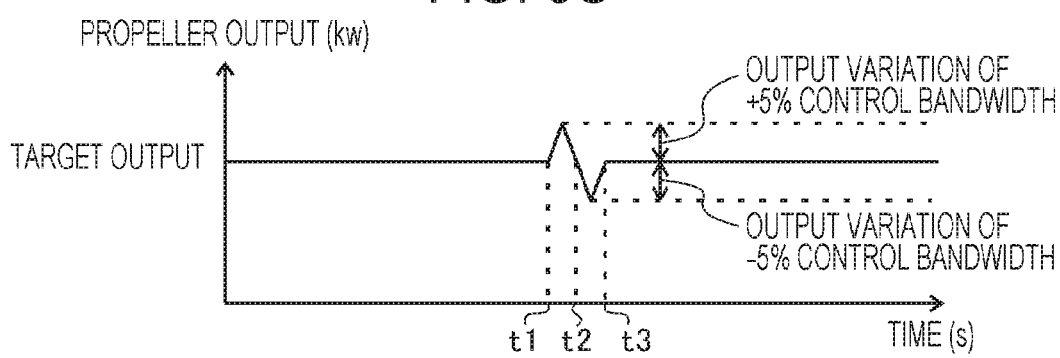
Figure 5D:
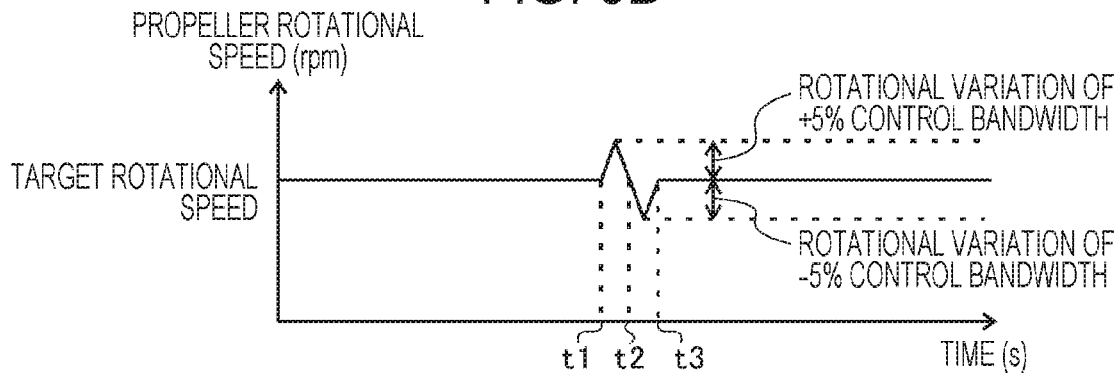

FIG. 5A to FIG. 5D illustrate the relationship among the motor output of the motor 17a, the braking force of the electromagnetic brake 17b, and the propeller output and the propeller rotational speed of the propeller 19. In FIG. 5A to FIG. 5D, the motor output of the motor used for levitating the body of the VTOL aircraft 1 (i.e., the rated torque and the rated rotational speed illustrated in FIG. 4) is defined as a target output. FIG. 5A illustrates a state where the motor 17a is outputting a motor output (i.e., an actual output) that is larger than the target output. FIG. 5B illustrates a state where the electromagnetic brake 17b is applying a braking force. FIG. 5C illustrates, as a propeller output, a combined output of the motor output of the motor 17a and the braking force of the electromagnetic brake 17b (i.e., motor output—braking force). The combined output may also be regarded as an actual output of the driving unit 17. FIG. 5D illustrates the propeller rotational speed when the propeller 19 is rotating with the propeller output illustrated in FIG. 5C.

As illustrated in FIG. 5A, the motor 17a is capable of outputting an actual output that is larger than the target output by a predetermined amount. In FIG. 5A, the motor 17a is outputting a fixed actual output. As illustrated in FIG. 5B, the electromagnetic brake 17b is applying a fixed braking force to the shaft 17c until a time point t1 is reached. For example, the fixed braking force is substantially equal to a difference between the actual output of the motor 17a and the target output illustrated in FIG. 5A.

The electromagnetic brake 17b applies a small braking force smaller than the fixed braking force to the shaft 17c in a period from the time point t1 to a time point t2. The electromagnetic brake 17b applies a large braking force larger than the fixed braking force to the shaft 17c in a period from the time point t2 to a time point t3. The electromagnetic brake 17b applies the fixed braking force to the shaft 17c from the time point t3 and onward.

As illustrated in FIG. 5C, the propeller output becomes a value obtained by subtracting the braking force of the electromagnetic brake 17b from the actual output of the motor 17a. In detail, until the time point t1 is reached, the propeller output is a value obtained by subtracting the fixed braking force from the actual output. In this case, the propeller output is substantially equal to the target output. In the period from the time point t1 to the time point t2, the propeller output is a value obtained by subtracting the small braking force from the actual output. In this case, the propeller output is a value larger than the target output by a variation in the small braking force. In the period from the time point t2 to the time point t3, the propeller output is a value smaller than the target output by a variation in the large braking force.

As illustrated in FIG. 5C, the electromagnetic brake controller 13b controls the braking force in a period from the time point t1 to the time point t3, thereby controlling the propeller output within a short period of time in a +5% control bandwidth and a −5% control bandwidth relative to the target output. Furthermore, for example, the electromagnetic brake controller 13b controls the propeller output to an output larger than the target output by 5% in half of the period between the time point t1 and the time point t2. Likewise, the electromagnetic brake controller 13b controls the propeller output to an output smaller than the target output by 5% in half of the period between the time point t2 and the time point t3. In this case, half of the period between the time point t1 and the time point t2 and half of the period between the time point t2 and the time point t3 are response time periods corresponding to the 5-Hz aircraft-direction control characteristics.

As illustrated in FIG. 5D, until the time point t1 is reached, the propeller rotational speed is a target rotational speed that is fixed in accordance with the propeller output. In the period from the time point t1 to the time point t2, the propeller rotational speed is higher than the target rotational speed in accordance with the propeller output. In the period from the time point t2 to the time point t3, the propeller rotational speed is lower than the target rotational speed in accordance with the propeller output.

As illustrated in FIG. 5D, the electromagnetic brake controller 13b controls the braking force in the period from the time point t1 to the time point t3, thereby controlling the propeller rotational speed in the +5% control bandwidth and the −5% control bandwidth relative to the target rotational speed of the propeller 19. Furthermore, for example, the electromagnetic brake controller 13b controls the propeller rotational speed to a rotational speed higher than the target rotational speed by 5% in half of the period between the time point t1 and the time point t2. Likewise, the electromagnetic brake controller 13b controls the propeller rotational speed to a rotational speed lower than the target rotational speed by 5% in half of the period between the time point t2 and the time point t3. In this case, half of the period between the time point t1 and the time point t2 and half of the period between the time point t2 and the time point t3 are response time periods corresponding to the 5-Hz aircraft-direction control characteristics.

By combining the motor output of the motor 17a and the braking force of the electromagnetic brake 17b in this manner, the rotary wing driving apparatus 100 can ensure the 5% control bandwidth relative to the target output (target rotational speed) and the 5-Hz aircraft-direction control characteristics, as illustrated in FIG. 5C and FIG. 5D.

In this embodiment, the motor 17a is capable of outputting an actual output that is larger than the rated torque and the rated rotational speed (i.e., the target output) illustrated in FIG. 4 by the predetermined amount. During the rated operation of the motor 17a, the motor controller 13a controls the motor 17a such that the motor 17a outputs an actual output that is larger than the target output by the predetermined amount. In this case, the electromagnetic brake controller 13b controls the braking force applied to the shaft 17c of the motor 17a, thereby controlling the propeller output (i.e., the propeller rotational speed) with the 5% control bandwidth relative to the target output (target rotational speed) and the 5-Hz aircraft-direction control characteristics.

For example, if the target torque (i.e., the rated torque illustrated in FIG. 4) in the target output is 3.5 N·m and the target rotational speed (i.e., the rated rotational speed illustrated in FIG. 4) is 8000 rpm, the rotary wing driving apparatus 100 includes the motor 17a capable of outputting an actual output that is larger than 3.5 N·m and 8000 rpm by the predetermined amount so as to ensure the 5% control bandwidth. The motor 17a capable of outputting an actual output that is larger than 3.5 N·m and 8000 rpm by the predetermined amount is, for example, a motor with a maximum torque that is less than double the rated torque (3.5 N·m).

Accordingly, in the rotary wing driving apparatus 100 according to this embodiment, the motor 17a used for performing stable attitude-angle control of the VTOL aircraft 1 is smaller than that in the related art (i.e., has a maximum torque that is less than double the rated torque). Therefore, the rotary wing driving apparatus 100 can suppress an increase in size of the motor 17a in the VTOL aircraft 1. Moreover, the rotary wing driving apparatus 100 uses the electromagnetic brake 17b as a device for applying braking torque to the shaft 17c. Therefore, the rotary wing driving apparatus 100 can shorten the variation time (response) of the braking torque, as compared with a case where a hydraulic brake is used as a device for applying braking torque to the shaft 17c.

Although an embodiment of the present disclosure has been described above with reference to the appended drawings, the present disclosure is not limited to the embodiment. It is obvious to a person skilled in the art that various modifications and alterations are possible within the scope defined in the claims, and it is to be understood that such modifications and alterations belong to the technical scope of the disclosure.

For example, there are also provided a program for causing a computer to function as the central controller 13 of the rotary wing driving apparatus 100 and a storage medium, such as any one of a computer-readable flexible disk, magneto-optical disk, ROM, compact disc (CD), digital versatile disc (DVD), or Blu-ray disc (BD), having the program stored therein. The program in this case refers to a data processing unit described in any language and any description method.

In this embodiment, the electromagnetic brake controller 13b causes the power source 9 to store the electric power generated by the electromagnetic brake 17b. Alternatively, the electromagnetic brake controller 13b may be configured not to cause the power source 9 to store the electric power generated by the electromagnetic brake 17b.

According to an embodiment of the present disclosure, an increase in size of the motor can be suppressed.

The invention claimed is:

1. A rotary wing driving apparatus comprising:
a motor;
a rotary wing attached to a shaft of the motor;
an electromagnetic brake attached to the shaft of the motor;
a motor controller that controls the motor to output an actual output that is larger than a target output by a predetermined amount; and
an electromagnetic brake controller that controls a braking torque of the electromagnetic brake, and controls a braking force applied to the shaft of the motor to control a propeller output of the rotary wing using a 5% control bandwidth relative to the target output and 5-Hz aircraft-direction control characteristics.

2. The rotary wing driving apparatus according to claim 1, further comprising:
a power source,
wherein the electromagnetic brake controller is configured to cause the power source to store electric power generated by the electromagnetic brake.

3. The rotary wing driving apparatus according to claim 1, wherein the propeller output is a combined output of the actual output of the motor and the braking force.

4. The rotary wing driving apparatus according to claim 1, wherein the target output indicates a motor output of the motor applied for levitating a body of an aircraft equipped with the rotary wing driving apparatus.

* * * * *